United States Patent [19]

Seiler et al.

[11] 3,978,160

[45] Aug. 31, 1976

[54] MANUFACTURE OF LOW MOLECULAR WEIGHT BLOCK COPOLYMERS OF VINYL OR DIENE MONOMERS AND ALKYLENE OXIDES

[75] Inventors: Erhard Seiler, Ludwigshafen; Gerhard Fahrbach, Schwetzingen; Dieter Stein, Limburgerhof, all of Germany

[73] Assignee: Badische Anilin- & Soda-Fabrik Aktiengesellschaft, Ludwigshafen (Rhine), Germany

[22] Filed: July 30, 1973

[21] Appl. No.: 383,894

[30] Foreign Application Priority Data

Aug. 2, 1972  Germany............................ 2237954

[52] U.S. Cl. ........................ 260/874; 260/77.5 CR; 260/887; 260/901
[51] Int. Cl.²..................... C08L 23/00; C08L 33/04
[58] Field of Search..................... 260/874, 887, 901

[56] References Cited

UNITED STATES PATENTS

| | | | |
|---|---|---|---|
| 3,050,511 | 8/1962 | Szwarc | 260/93.5 A |
| 3,175,997 | 3/1965 | Hsieh | 260/85.1 |

*Primary Examiner*—Richard B. Turer
*Attorney, Agent, or Firm*—Johnston, Keil, Thompson & Shurtleff

[57] ABSTRACT

Manufacture of low molecular weight block copolymers of vinyl or diene monomers and alkylene oxides. In a first stage, the vinyl or diene monomers are polymerized as chain stopper, and in a second stage, one or two blocks A are added thereto by the addition of further alkylene oxide. The resulting block copolymers may be used as prepolymers for the manufacture of polyurethanes, as dispersing agents for dyes, as antistatic agents, emulsifiers, surfactants or as paper and textile finishing agents.

11 Claims, No Drawings

MANUFACTURE OF LOW MOLECULAR WEIGHT BLOCK COPOLYMERS OF VINYL OR DIENE MONOMERS AND ALKYLENE OXIDES

According to U.S. Pat. No. 3,050,511, block copolymers of styrene and ethylene oxide may be manufactured by effecting polymerization in stages using organometallic compounds as initiators. If, in this process, the concentration of initiator is increased, there is not obtained a uniform low molecular weight block copolymer as would be expected on theoretical considerations. On the contrary, there are produced high molecular weight products showing a very uneven distribution of molecular weights and composition and containing a great deal of discretely polymerized polyethylene oxide. The reason for this is probably the high polymerization rate of styrene, the growth reaction of the chains being more rapid than the initiating reaction so that only a few but long polystyrene chains are formed and a portion of the initiator remains unconsumed.

In Japanese Pat. No. 34,984/71 there is proposed a process for the manufacture of novel polyethers, wherein butadiene is first polymerized with the aid of an organometallic initiator, whereupon the growing chain is stopped by the addition of alkylene oxide and is then hydrolyzed. Using alkaline initiators, further alkylene oxide is then added to the resulting polybutadiene diol having a molecular weight of from 500 to 5,000. This process suffers from the drawback that the polybutadiene diol must be recovered by hydrolysis and then isolated.

It is an object of the invention to provide a simple process for the manufacture of low molecular weight block copolymers of vinyl and/or diene monomers and alkylene oxides.

We have found that such block copolymers may be obtained if, in a first stage, vinyl and/or diene monomers are polymerized and in the presence of an alkylene oxide as chain stopper, the molar ratio of monomer to initiator being greater than 1:1 and preferably greater than 3:1, and the molar ratio of initiator to chain stopper being equal to or greater than 1:1, and, in a second stage, one or two alkylene blocks A are added to said block B by the addition of further amounts of alkylene oxide.

In this way, block copolymers of the general formula AB(A) may be produced, where A is polyalkylene oxide and B is a vinyl or diene polymer, the mean degree of polymerization of blocks A and B being from 2 to 50 and preferably from 5 to 20.

Preferred alkylene oxides both for the block A and for use as chain stopper in the production of block B are those having from 2 to 4 carbon atoms, for example ethylene oxide and propylene oxide. It will be appreciated that the alkylene oxides to be used must be in a state of high purity.

Suitable monomers for the formation of block B are dienes and vinyl compounds, for example butadiene, isoprene, methyl methacrylate, styrene and styrenes substituted with methyl or chlorine. These monomers may be used alone or in admixture with each other when forming the block B.

The initiators used are organometallic compounds, suitable compounds being, for example, adducts of lithium, sodium or potassium with α-methylstyrene, stilbene, diphenyl, naphthalene and other higher-condensed aromatic hydrocarbons. These compounds have a difunctional action, i.e. the polymers produced have the structure ABA.

Monofunctional initiators are for example cumyl potassium, benzyl potassium, phenyl potassium and n-butyl lithium. In general, potassium compounds are preferred because they produce a higher rate of polymerization. The amount of initiator used should preferably be between 0.2 and 0.05 mole per mole of total monomer.

Polymerization is carried out in inert organic solvents, for example ethers such as diethyl ether, anisol, tetrahydrofuran and dioxane. Alternatively, hydrocarbons such as hexane, benzene and ethyl benzene may be used and also mixtures of hydrocarbons with ethers. Polymerization is carried out with the exclusion of atmospheric oxygen, preferably under an atmosphere of nitrogen. The temperature should be between $-120°$ and $+100°C$ and preferably between $-80°C$ and $+50°C$.

In the first polymerization stage, block B is produced by polymerization of the vinyl or diene monomers. This polymerization is carried out in the presence of alkylene oxides acting as chain stoppers. Alkylene oxides can react with the living chain ends of the primary vinyl or diene polymers formed to form alcoholate end groups and thus prevent further addition of vinyl or diene monomer. Further alkylene oxide can be added to these alcoholate end groups when polymerization is continued in the second stage to form block or blocks A. Alkylene oxides react much more slowly than vinyl or diene monomers with the initiators so that the formation of alkylene oxide homopolymers is suppressed. This combination of factors means that blocks B are formed which have a low molecular weight which shows a relatively even distribution. By varying the molar ratios of monomer to initiator and of initiator to chain stopper, the molecular weight may also be varied. Basically, the molecular weight decreases as the amount of initiator used is increased. When the ratio of monomer to initiator is less than or approximately equal to 1:1, dimers to tetramers are formed. Preferably, the molecular ratio of monomer to initiator should be between 3:1 and 50:1. As mentioned above, the prerequisite for producing low molecular weights is the presence of chain stoppers during polymerization. Here again, an increase in the amount of chain stopper produces a reduction in molecular weight. The molar ratio of initiator to chain stopper should be equal to or greater than 1:1 and preferably between 1:1 and 20:1.

Polymerization in the first stage is conveniently carried out by placing solvent and initiator in a vessel and then adding monomer and chain stopper together or separately. Special effects may be achieved by adding these two components at different rates.

The addition of block A follows directly on the polymerization of block B, conveniently in situ, by the addition of further alkylene oxide. In this polyaddition reaction, the alkylene oxide is added to the living chain end or ends of the block B. The relative amount of alkylene oxide used depends on the desired molecular weight of block A.

When the reaction is complete, chain stopping is effected by hydrolysis, for example with acetic acid. Etherification of the chain ends is also possible by chain-stopping with esters.

The low molecular weight block copolymers of the invention may be used for example as prepolymers in the manufacture of polyurethanes and as dispersing agents for dyes. These block copolymers also give good results when used as antistatic agents for incorporation in materials of construction. Other applications for these block copolymers include their use as emulsifiers, surfactants and finishing agents for paper and textiles.

EXAMPLE 1

1,250 ml of tetrahydrofuran and 1,250 ml of a 0.5M solution of potassium naphthalene (0.625 mole) in tetrahydrofuran were placed in a 5 l stirred vessel which had been purged with nitrogen. The solution was cooled to −10°C. A mixture of 435 g (4.18 moles) of styrene and 22 g (0.5 mole) of ethylene oxide was added dropwise over 15 minutes. At the thus selected ratio of monomer to initiator, the molecular weight was calculated to be 1,450. However, the empirical mean molecular weight was 4,500, this being equivalent to an average degree of polymerization of block B of 43. The conversion was 100%.

In the second stage, 800 g (81.15 moles) of ethylene oxide were added to the above solution and the polymerization temperature was kept at 30°C by cooling with cold water. The total molecular weight was 11,500, this being equivalent to an average degree of polymerization of each of the two blocks A of 80. The living chain ends were stopped by the addition of a few drops of acetic acid. The block copolymer formed was precipitated by pouring the solution into petroleum ether. The block copolymer contained less than 5% of homo-polyethylene oxide.

For the purposes of comparison, the same block copolymerization was carried out without the addition of chain stopper. This produced a block copolymer in which block B has an average molecular weight of about 40,000 and which contained 35% of homo-polyethylene oxide.

EXAMPLE 2

1,500 ml of tetrahydrofuran and 1,000 ml of a 0.5M solution of α-methylstyrene dipotassium (0.5 mole) in tetrahydrofuran were placed in a 5 l stirred vessel equipped with a very high-speed stirrer. At −40°C, 273 g of styrene (2.62 moles) and 22 g of ethylene oxide (0.5 mole) were added. The theoretical molecular weight was calculated to be 1,600 and the empirical molecular weight was, on average, 1,350, this being equivalent to an average degree of polymerization of 13 for block B.

There were than added 670 g of ethylene oxide (15.2 moles) and polymerization was stopped by the addition of acetic acid. The final product had a molecular weight of 4,100, the two blocks A having an average degree of polymerization of 31.8% of the product consisted of homo-polyethylene oxide.

In a comparative experiment without the use of chain stopper, a product was formed which contained 30% of homo-polyethylene oxide and which had a block B having a molecular weight of 10,500.

EXAMPLE 3

1,500 ml of tetrahydrofuran and 1,000 ml of a 0.5M solution of potassium naphthalene (0.5 mole) in tetrahydrofuran were placed in a 5 l stirred vessel purged with nitrogen. The solution was cooled to −15°C. A mixture of 312 g of butadiene (5.77 moles) and 4.4 g of ethylene oxide (0.1 mole) was then added over 10 minutes. The theoretical molecular weight was calculated to be 1,250 and the average molecular weight found was 1,650, this being equivalent to an average degree of polymerization of block B of 30.

There were then added 445 g of ethylene oxide (10.1 moles) and the reaction was stopped with acetic acid on completion of the copolymerization of the ethylene oxide. The final product had a molecular weight of 3,600, this being equivalent to an average degree of polymerization of 20 for each of the two blocks A. The content of homo-polyethylene oxide was 9%.

For the purposes of comparison, the same copolymerization was carried out without the addition of chain stopper. In this case, block B had an empirical molecular weight of 8,500 and the block copolymer contained 22% of homo-polyethylene oxide.

EXAMPLE 4

Polymethyl methacrylate was produced as block B. Graft reactions between the living ethoxy chain ends and the ester groupings of the polymethyl methacrylate chain occur so that branched-chain products are obtained which have molecular weights which are higher than calculated.

2,000 ml of tetrahydrofuran and 300 ml of a 0.5M solution of α-methylstyrene dipotassium (0.15 mole) in tetrahydrofuran were placed in the polymerization vessel. 265 g of methyl methacrylate (2.64 moles) and 4.4 g of ethylene oxide (0.1 mole) were then added dropwise with vigorous stirring. The molecular weight of block B, as found empirically, was 20,000. 445 g (10.1 moles) of ethylene oxide were then added. The content of homo-polyethylene oxide in the final product was less then 3%, the total conversion being 87%.

We claim:

1. A process for the manufacture of low molecular weight block copolymers which comprises:
    a. polymerizing vinyl or diene monomers selected from the group consisting of butadiene, isoprene, styrene, methyl methacrylate, methyl-substituted styrene, chloro-substituted styrene or mixtures thereof in a first stage to form a block B, said polymerization being carried out in the presence of an organometallic compound which acts as an initiator and in the presence of an alkylene oxide which acts as a chain stopper, said vinyl or diene monomer and said alkylene oxide being added together or separately to a solution of said initiator, the molar ratio of monomer to initiator being greater than 1:1 and the molar ratio of initiator to chain stopper being greater than or equal to 1:1; and, after the formation of said block B has been completed,
    b. adding further alkylene oxide in a second stage to add one or two polyalkylene blocks A to said block B, each of said blocks A and B having a degree of polymerization of from 2 to 50, said first stage and second stage polymerization being carried out in the presence of an inert organic solvent and at a temperature of from −120°C to +100°C with the exclusion of atmospheric oxygen.

2. A process for the manufacture of low molecular weight block copolymers as claimed in claim 1, wherein alkylene oxides of from 2 to 4 carbon atoms are used.

3. A process for the manufacture of low molecular weight block copolymers as claimed in claim 2, wherein the degree of polymerization of blocks A and B are between 5 and 20.

4. A process for the manufacture of low molecular weight block copolymers as claimed in claim 1, wherein ethylene oxide is used.

5. A process for the manufacture of low molecular weight block copolymers as claimed in claim 2, wherein the organometallic initiators used are adducts of potassium.

6. A process for the manufacture of low molecular weight block copolymers as claimed in claim 2, wherein the molar ratio of monomer to chain stopper is from 3:1 to 50:1.

7. A process for the manufacture of low molecular weight block copolymers as claimed in claim 2, wherein the molar ratio of initiator to chain stopper is between 1:1 and 20:1.

8. A process as set forth in claim 2 wherein the polymerizations are carried out at a temperature of $-80°C$ to $+50°C$.

9. A process as set forth in claim 7 wherein the amount of initiator is from 0.2 to 0.05 mole per mole of monomer.

10. A process as set forth in claim 9 wherein in the first stage a mixture of monomer and alkylene oxide is added to a solution of initiator.

11. A process as set forth in claim 1, wherein said vinyl or diene monomer is styrene and said alkylene oxide is ethylene oxide.

\* \* \* \* \*